United States Patent

Kinouchi et al.

[11] Patent Number: 6,042,910
[45] Date of Patent: Mar. 28, 2000

[54] POLYARYLENE SULFIDE RESIN COMPOSITION

[75] Inventors: Satoru Kinouchi; Tomoyoshi Murakami; Shigemasa Suzuki, all of Chiba, Japan

[73] Assignee: Idemitsu Petrochemical Co., Ltd., Tokyo, Japan

[21] Appl. No.: 09/015,267

[22] Filed: Jan. 29, 1998

[51] Int. Cl.[7] .......................... B29D 22/00; C08L 81/04; C08L 67/03
[52] U.S. Cl. .................. 428/35.7; 525/440; 525/446; 525/452; 525/454; 525/464; 525/487; 525/537; 524/539; 524/588; 524/589
[58] Field of Search ...................... 525/537, 907, 525/100, 103, 446, 452, 454, 464, 487, 440, 474; 524/539, 588, 589; 361/679

[56] References Cited

U.S. PATENT DOCUMENTS

| | | | |
|---|---|---|---|
| 4,929,665 | 5/1990 | Inoue et al. | 524/500 |
| 5,008,363 | 4/1991 | Mallon et al. | 528/49 |
| 5,110,861 | 5/1992 | Togami et al. | 524/601 |
| 5,804,626 | 9/1998 | Rogers et al. | 524/195 |

*Primary Examiner*—Mark L. Warzel
*Attorney, Agent, or Firm*—Oblon, Spivak, McClelland, Maier & Neustadt, P.C.

[57] ABSTRACT

A polyarylene sulfide resin composition comprising (A) a polyarylene sulfide resin, (B) an aliphatic or saturated cyclic polycarbodiimide resin or a precursor thereof, and preferably (C) reactive silicone compound grains, and (D) a polyethylene naphthalate resin or (E) a filler, which improves excellent properties exhibited by polyarylene sulfide resins, and which is also endowed with an excellent adhesion characteristics to adhesives such as epoxy resins. In addition, a molded article obtained by molding a polyarylene sulfide resin composition endowed with such excellent properties is useful as a container for accommodating an electric component material. Such a molded article may also be used as an electronic component having conductive portions which are totally or partially accommodated in the container, wherein the conductive portions are seled by a sealant encapsulated in the container.

13 Claims, No Drawings

POLYARYLENE SULFIDE RESIN COMPOSITION

BACKGROUND OF THE INVENTION

1. Field of the Invention

The present invention relates to a polyarylene sulfide resin composition, and more particularly, to a polyarylene sulfide resin composition having superior adhesion properties to an adhesive of epoxy resins or the like.

The present invention also relates to a container for accommodating electronic-component material and to an electronic component, and more particularly, to a container for accommodating electronic-component material which is molded from a polyarylene sulfide resin composition having superior adhesion properties with respect to a sealant for sealing a conductive portion of the electric component material, as well as to an electronic component whose conductive portions are sealed by a sealant encapsulated in the container.

2. Related Art

Polyarylene sulfide resin (hereinafter often referred to as "PAS resin") is an engineering plastic possessing heat resistance, fire resistance, electrical characteristics, or various superior mechanical and physical properties and is expected to be widely used in various fields of, e.g., mechanics, electricity, electronics, or automotive parts. Although there is a case where PAS resin having superior characteristics such as those mentioned previously is solely used, PAS resin is also used in the form of a laminated composite material containing another material, such as another resin, ceramics, or metal, or in the form of a laminated composite material containing other types of PAS resin of different performance characteristics, with a view to further improving the performance of PAS resin.

Such a composite material is manufactured by laminating PAS resin and another material with an adhesive composed of, e.g., epoxy resins, silicone resins, or urethane resins. In such a case, a composite material of insufficient adhesive strength may be produced, because it is hard to bond PAS resin itself to such an adhesive. For example, a known method of improving the adhesive strength between PAS resin and the adhesive comprises: a method of increasing the surface area of PAS resin by formation of minute channels in the surface of base material made of PAS resin through use of mechanical means such as friction; a method of deteriorating the surface of PAS resin by partial corrosion of the surface; and a method of priming the surface of PAS resin with a chemical primer. Another known method is one by which PAS resin is alloyed with another resin such as a thermoplastic resin, e.g., a high-water-absorptive resin led by polyacrylates, or by mixing PAS resin with an additive.

However, under the method of improving adhesion properties of PAS resin to an adhesive by treating the surface of PAS resin, there occurs an increase in the number of processes required for manufacturing a composite material. Further, depending on the type of PAS resin, a sufficient bonding effect is not always attained. For example, it is difficult to manufacture from PAS resin a composite material which is used under conditions where high temperature and constant vibrations are encountered and which is required to have adhesion properties to a specific resin such as an epoxy resin. Further, in a case where PAS resin is used for manufacturing a container for accommodating electronic-component material, since PAS resin has insufficient adhesion properties with respect to a sealant (such as epoxy resin), used for sealing conductive portions of each electronic-component material to be accommodated in the container, a minute clearance arises between the container made of PAS resin and the sealant, thereby posing problems such as electric discharge or a degradation in the electrical characteristics of the electronic-component material as a result of entry of moisture into the electronic-component material. There is also another problem of the container made of PAS resin itself being separated or exfoliated from the contents of the container.

Since most thermoplastic resins capable of improving the adhesion properties of PAS resin with respect to an adhesive have lower heat resistance than that of PAS resin, the method of mixing thermoplastic resin with PAS resin brings about a degradation in heat resistance of PAS resin—a characteristic feature of PAS resin—thus further resulting in a considerable reduction in mechanical strength of PAS resin. Particularly, in a case where PAS resin is used for manufacturing a container for accommodating electronic-component material, the adhesion properties of PAS resin with respect to a sealant are improved to a certain extent. However, since the heat resistance of PAS resin decreases, there arises a new problem of PAS resin becoming decomposed and generating gas or a new problem of the container becoming cracked as a result of a decrease in the mechanical strength of PAS resin. As things stand now, there has not yet been produced any substance which improves various superior characteristics of PAS resin and which possesses superior adhesion properties with respect to a sealant in a case where PAS resin is used for manufacturing a container for accommodating electronic-component material.

Further, depending on applications, there is strong demand for development of PAS resin possessing superior adhesion properties with respect to an adhesive made of, e.g., silicone resins other than epoxy resins or urethane resins.

SUMMARY OF THE INVENTION

The present invention was accomplished in view of the aforementioned problems, and an object of the invention is to provide a polyarylene sulfide resin composition which exhibits excellent adhesion to adhesives such as epoxy resins while enhancing good, inherent characteristics (e.g., heat resistance, flame resistance, electric characteristics, and mechanical properties) of a PAS resin.

Another object of the present invention is to provide a container for accommodating electronic-component material which employs, wholly or in part, a molded PAS resin exhibiting excellent adhesion to a sealant.

Still another object of the present invention is to provide an electronic component whose conductive portions are wholly or partially accommodated in the container.

The present inventors have conducted earnest studies, and have found that the above objects are effectively attained by a polyarylene sulfide resin composition having a specified composition, thus leading to completion of the invention. Accordingly, the present invention is directed to the following.

According to a first aspect of the present invention, there is provided a polyarylene sulfide resin composition comprising (A) 70–99.9% by weight of a polyarylene sulfide resin and (B) 30–0.1% by weight of an aliphatic or a saturated cyclic polycarbodiimide resin or a precursor thereof.

According to a second aspect of the present invention, there is provided a polyarylene sulfide resin composition comprising (A) 65–99.8% by weight of a polyarylene sulfide resin, (B) 0.1–5% by weight of an aliphatic or a saturated cyclic polycarbodiimide resin or a precursor thereof, and (C) 0.1–30% by weight of a granular silicone compound.

According to a third aspect of the present invention, there is provided a polyarylene sulfide resin composition comprising 100 parts by weight of a resin component containing (A) 70–99.9% by weight of a polyarylene sulfide resin and (B) 30–0.1% by weight of an aliphatic or a saturated cyclic polycarbodiimide resin or a precursor thereof, and 1–400 parts by weight of (E) a filler.

According to a fourth aspect of the present invention, there is provided a polyarylene sulfide resin composition comprising 100 parts by weight of a resin component containing (A) 65–99.8% by weight of a polyarylene sulfide resin, (B) 0.1–5% by weight of an aliphatic or a saturated cyclic polycarbodiimide resin or a precursor thereof, and (C) 0.1–30% by weight of a granular silicone compound; and 1–400 parts by weight of (E) a filler.

According to a fifth aspect of the present invention, there is provided a polyarylene sulfide resin composition comprising 90–99.9% by weight of a resin component containing (A) 50–96 parts by weight of a polyarylene sulfide resin and (D) 4–50 parts by weight of a polyethylene naphthalate resin which preferably contains 5 mol % or more of an ethylene naphthalate recurring unit; and (B) 0.1–10% by weight of an aliphatic or a saturated cyclic polycarbodiimide resin or a precursor thereof.

According to a sixth aspect of the present invention, there is provided a polyarylene sulfide resin composition comprising 100 parts by weight of a resin component which comprises 90–99.9% by weight of a resin composition containing (A) 50–96 parts by weight of a polyarylene sulfide resin and (D) 4–50 parts by weight of a polyethylene naphthalate resin, and 00.1–10% by weight of an aliphatic or a saturated cyclic polycarbodiimide resin or a precursor thereof; and 1–800 parts by weight of (E) a filler.

According to a seventh aspect of the present invention, there is provided a container for accommodating electronic-component material which employs, wholly or in part, a molded PAS resin comprising a polyarylene sulfide resin composition of the first or third aspect.

According to an eighth aspect of the present invention, there is provided an electronic component whose conductive portions are wholly or partially accommodated in a container for accommodating electronic-component material of the secenth aspect, wherein the conductive portions are sealed by a sealant encapsulated in the container.

According to a ninth aspect of the present invention, there is provided an electronic component whose conductive portions are wholly or partially placed on a plate comprising a polyarylene sulfide resin composition of the first or third aspect, wherein the conductive portions are sealed by a sealant.

MODES FOR CARRYING OUT THE INVENTION

Next will be described in detail the polyarylene sulfide resin composition, the container for accommodating electronic-component material, and the electronic component whose conductive portions are wholly or partialy accommodated in the container of the present invention.

1. Polyarylene Sulfide Resin Composition
1) Individual Components used in Polyarylene Sulfide Resin Composition
(1) Polyarylene Sulfide Resin (Component (A))
The Polyarylene sulfide resin (hereinafter may be referred to as PAS resin) used in the present invention is a polymer containing 70 mol % or more of a recurring unit represented by the structural formula of —Ar—S—, wherein Ar represents an arylene group. A typical recurring unit is represented by formula (1):

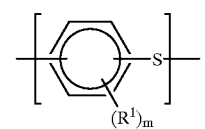

(1)

wherein $R^1$ represents a substituent selected from among an alkyl group having 6 or less carbon atoms, an alkoxy group, a phenyl group, a carboxylic acid/metal salt, an amino group, a nitro group, and a halogen atom such as a fluorine atom, a chlorine atom, or a bromine atom; and m is an integer between 0 and 4 inclusive.

The PAS resin of the present invention generally has a molecular weight of 0.1–0.5 dl/g, preferably 0.13–0.4 dl/g, more preferably 0.15–0.3 dl/g, as represented by intrinsic viscosity ($\eta_{inh}$) measured in α-chloronaphthalene (viscosity at measurement: 0.4 g/dl) at 206° C.

The PAS resin used in the present invention is a homopolymer or a copolymer containing preferably 70 mol % or more, more preferably 80 mol % or more, of a p-phenylene sulfide unit as a recurring unit. When the content of the recurring unit is less than 70 mol %, crystallinity inherent to the crystalline polymer decreases disadvantageously, which tends to result in poor mechanical properties. Examples of the structural unit of the copolymer include a m-phenylene sulfide unit, an o-phenylene sulfide unit, a p,p'-diphenylene ketone sulfide unit, a p,p'-diphenylene sulfone sulfide unit, a p,p'-biphenylene sulfide unit, a p,p'-diphenylene ether sulfide unit, a p,p'-diphenylene methylene sulfide unit, a p,p'-diphenylnene cumenyl sulfide unit, and a naphthyl sulfide unit.

Preferable examples of the PAS resin of the present invention include a polyphenylene sulfide resin (hereinafter may be referred to as PPS) represented by the below-described formula (2):

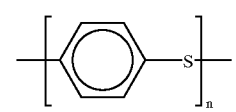

(2)

wherein n is 2 or more.

Examples of conventional PAS resins include a substantially linear PAS resin having neither branched nor cross-linked structure and obtained through selection of an appropriate manufacturing method; a PAS resin having a branched structure obtained through use of a small amount of a comonomer having three or more functional groups; and a PAS resin having a cross-linked structure obtained through thermal treatment (annealing). The PAS resin of the present invention encompasses any PAS resin so long as it contains a recurring unit represented by formula —Ar—S—, wherein Ar represents an arylene group. Alternatively, a resin composition obtained by blending a linear PAS resin having neither a branched nor a cross-linked structure with a PAS resin having a branched or cross-linked structure may also be used in the present invention.

The above-described PAS resin may be obtained through a known polycondensation process employing an aromatic dihalo compound and a sulfur source in an organic polar solvent.

Furthermore, as to the PAS resins of the present invention, there is preferably used a PAS resin having in its structure a functional group such as an —SH group, an —NH$_2$ group, a —COOH group, or an —OH group that is reactive with a polycarbodiimide resin which serves as component (B). The functional group may be contained in anywhere of the recurring units of the PAS resin or may terminate an end of the PAS resin. Alternatively, a PAS resin modified with an acid such as maleic acid or phthalic acid may also be used as the PAS resin of the present invention. Each of these PAS resins having a functional group or a modification group may be manufactured through a known method.

(2) Aliphatic or Saturated Cyclic Polycarbodiimide Resin or Precursors Thereof (Component (B))

In the present invention, an aliphatic or a saturated cyclic polycarbodiimide resin or a precursor thereof is used as component (B). Incorporation of component (B) into a PAS resin results in remarkably improved adhesion between the PAS resin and a variety of adhesives.

As used herein, an aliphatic polycarbodiimide resin denotes a compound wherein two or more carbodiimide groups (—N=C=N—) are linked via an aliphatic hydrocarbon group having two or more connecting bonds, preferably a divalent group. A saturated cyclic polycarbodiimide resin herein denotes a compound wherein two or more carbodiimide groups (—N=C=N—) are linked via a saturated cyclic hydrocarbon group having two or more connecting bonds, preferably a divalent group. Of such aliphatic or saturated polycarbodiimide resins, preferred ones are carbodiimide compounds having a recurring unit represented by formula —N=C=N—R—, wherein R an aliphatic or saturated cyclic hydrocarbon group having two or more connecting bonds, preferably a divalent group. Examples of the aliphatic or saturated cyclic hydrocarbon groups having two or more connecting bonds include a trimethylene group, a tetramethylene group, a pentamethylene group, a hexamethylene group a heptamethylene group, a methylbutylethylmethylene group, a cyclopentylene group, a cyclohexylene group, a methylcyclopentylene group, a methylcyclohexylene group, and a methylenebis (cyclohexyl) group. Of these, saturated cyclic hydrocarbon groups such as a cyclohexylene group, a methylcyclopentylen group, a methylcyclohexylene group, and a methylenebis(cyclohexyl) group are preferred. The aliphatic or saturated cyclic polycarbodiimide resin typically has a carbodimide equivalent of 100–600, preferably 200–400, particularly preferably 250–350. The aliphatic or saturated cyclic polycarbodiimide resin may be in the form of liquid or powder. No particular limitation is imposed on the viscosity of the liquid or on the particle size of the powder, and powder having an average particle size of 5–1,500 µm is preferred in view of ease of handling and readiness to be mixed with a resin component.

Examples of the aliphatic or saturated cyclic polycarbodiimide resin of the present invention include a variety of commercial products such as HMV-8CA (trade name, product of Nisshinbo Industries, Inc.); Ucarlnk XL-29SE, Ucarlnk XL-20, Ucarlnk XL-25SE, and Ucarlnk XL-27HS (trade names, products of Union Carbide Co.); and EX-5558 (trade name, product of Stahl Holland bv); as well as compounds disclosed in U.S. Pat. Nos. 5,081,173, 5,047, 588, 5,136,006, 5,373,080, 4,487,964, and 5,258,481 and those disclosed in European Patent Nos. 0241805, 0259511, 0274402, and 0277361. Specifically, mention may be given of poly(tricarbodiimide), poly(1,4-tetramethylenecarbodiimide), poly(1,6-hexamethylenecarbodiimide), poly(1,3-cyclohexylenecarbodiimide), and poly(4,4'-methylenebiscyclohexylcarbodiimide).

The aliphatic or saturated cyclic polycarbodiimide resin of the present invention may contain a functional group other than an aliphatic or a saturated cyclic polycarbodiimide group, such as an isocyanate group, and also may contain a small amount of an aromatic carbodiimide group so long as the effects of the present invention are not impaired. Also, the preferred aliphatic or saturated cyclic polycarbodiimide resin of the present invention may contain an aliphatic carbodiimide group or a saturated cyclic group exclusively and may be terminated with an isocyanate group (—NCO).

The aliphatic or saturated cyclic polycarbodiimide resin of the present invention is typically manufactured in the presence of a catalyst which accelerates carbodiimidation of an organic isocyanate. Examples of the organic isocyanate include hexamethylene 1,6-diisocyanate, cyclobutylene 1,3-diisocyanate, cyclopentylene 1,3-diisocyanate, cyclohexylene 1,3-diisocyanate, cyclohexylene 1,4-diisocyanate, 1-methylcyclohexylene 2,4-diisocyanate, 1-methylcyclohexylene 2,6-diisocyanate, 1-isocyanato-3,3, 5-trimethyl-5-isocyanatomethylcyclohexane, cyclohexane 1,3-bis(methylisocyanate), cyclohexane 1,4-bis (methylisocyanate), dicyclohexylmethane 2,4'-diisocyanate, dicyclohexylmethane 4,4'-diisocyanate, ethylene diisocyanate, tetramethylene 1,4-diisocyanate, hexamethylene 1,6-diisocyanate, dodecamethylene 1,12-diisocyanate, cyclohexane 1,3,5-triisocyanate, dicyclohexylmethane 2,4, 2'-triisocyanate, dicyclohexylmethane 2,4,4'-triisocyanate, and 4,4,4-tricyclohexylmethylene triisocyanate.

As used herein, the term "a precursor of aliphatic or saturated cyclic polycarbodiimide resin of the present invention" refers to a starting material for the above-described carbodiimidation. The material may be a mixture of precursors further containing either a catalyst or a mixture of a catalyst and an organic isocyanate of which the isocyanate group is blocked with a monofunctional active-hydrogen-containing compound such as phenol and aniline.

Examples of catalysts accelerating the carbodiimidation of an isocyanate group in an organic isocyanate include 1-phenyl-3-methyl-3-phosphorene-1-oxide, 1-ethyl-3-methyl-3-phosphorene-1-oxide, and 1-phenyl-3-phosphorene-1-oxide.

In the present invention, the above-described aliphatic or saturated cyclic polycarbodiimide resin or their precursors may be used singly or in combination.

Alternatively, the aliphatic or saturated cyclic polycarbodiimide resin or their precursors of the present invention may optionally be replaced partially or totally by a polymer-type silane coupling agent. The polymer-type silane coupling agent may comprise a polydimethylsiloxane having a side chain containing at least one, preferably three, unit(s) selected from (a) a group reactive to an inorganic substance such as an alkoxy group (X); (b) a group reactive to an organic substance such as an epoxy group or a hydroxyl group (Y); and (c) a group enhancing compatibility with an organic substance such as a polyether group or an alkyl group (Z).

Examples of preferable units include an alkoxy group such as a methoxy group, an ethoxy group, or a propoxy group as the above-described (X); an epoxy group as (Y); and a polyether group such as a polyoxymethylene group, a polyoxytrimethylene group, or a polyoxydecamethylene group as (Z), as well as an alkoxy group such as a methoxy group, an ethoxy group, or a propoxy group as the above-described (X); a hydroxyl group as (Y); and a polyether group such as a polyoxymethylene group, a polyoxytrimethylene group, or a polyoxydecamethylene group as (Z).

(3) Granular Silicone Compound (Component (c))

In the present invention, granular silicone compound may optionally be used as component (C). Blending component (C) with the PAS resin composition remarkably improves adhesion of the PAS resin to a variety of adhesives through a combined effect with component (B).

The silicone compound of the present invention has a high molecular weight which enables the compound to form grains, and examples of the compound include organopolysiloxanes and a silicone resin. As used herein, the term "a silicone compound" refers to an organic compound containing a silicon atom in its molecule. A silicone resin having a three-dimensional network structure is preferably granulated in that it has heat resistance and hardly generates sink marks during molding. No particular limitation is imposed on the grain size of the silicone compound grains of the present invention so long as the silicone compound is in the form of grains. The grain size distribution is typically about 0.1–1000 μm, preferably about 1–100 μm, particularly preferably about 5–50 μm. Preferably, bulk density is about 0.4–0.5 g/ml. True specific gravity is about 0.9–1.8, preferably about 1.3–1.6, and particularly preferably 1.5.

In the present invention, reactive silicone compound grains, obtained through introducing a functional group such as an epoxy group, a methacryl group, or an amino group into silicone compound grains, are particularly preferred in view of increased adhesive strength of the polyarylene sulfide resin composition to an adhesive or a sealing agent. No particular limitation is imposed on the introduction ratio of the functional groups. When a polycarbodiimide resin is used as component (B), reactive silicone compound grains, particularly those introduced with an epoxy group, are preferred.

(4) Polyethylene Naphthalate Resin (Component (D), Hereinafter may be Referred to as PEN Resin)

In the present invention, a polyethylene naphthalate resin may optionally be used as component (D). Blending component (D) with the PAS resin composition remarkably improves adhesion of the PAS resin to a variety of adhesives through a combined effect with component (B).

The PEN resin used in the present invention is a polyester having a main chain essentially containing an ethylene naphthalate recurring unit represented by formula (3). Typical examples of the PEN resin are represented by the below-described formula (3);

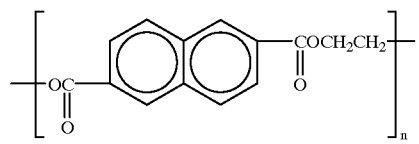

(3)

wherein n is an average polymerization degree represented by an integer of 1 or more, preferably 10–1000, more preferably 20–100.

The PEN resin of the present invention may contain a recurring unit other than the ethylene naphthalate recurring unit represented by formula (3). The ratio (compositional ratio) of the above-described recurring unit to another recurring unit may be arbitrarily modified as needed. In a preferable PEN resin, the content of an ethylene naphthalate unit is preferably 5 mol % or more, more preferably 10 mol % or more, and particularly preferably 10–85 mol % with respect to the total amount (100 mol %) of recurring units of the PEN copolymer. A PEN resin containing an ethylene naphthalate unit in an amount of less than 5 mol % has poor heat resistance and considerably decomposes upon melt-kneading with PPS, to possibly generate an odor. There may be used another recurring unit other than ethylene naphthalate so long as it is a recurring unit having an ester linkage. Examples of such a unit include an ethylene phthalate unit, an ethylene isophthalate unit, an ethylene terephthalate unit, a propylene terephthalate unit, a butylene terephthalate unit, a linear or cyclic alkylene terephthalate unit such as a cyclohexane terephthalate, and a carbonate unit containing a bisphenol such as bisphenol A or bisphenol Z. The alkylene terephthalate may include an alkylene terephthalate unit of which phthalate moiety is substituted by 1–4 alkyl group(s) such as a methyl group(s) and an ethyl group(s), as well as a non-substituted alkylene terephthalate unit. Of these, a non-substituted alkylene phthalate unit is preferred, and an ethylene terephthalate unit, a butylene terephthalate unit, and a cyclohexane terephthalate are particularly preferred.

Furthermore, when the PEN resin is a copolymer containing a recurring unit other than ethylene naphthalate, no particular limitation is imposed on the type of the copolymer. There may be used any of a random copolymer, a block copolymer, a graft copolymer, an alternating copolymer, and a composite thereof; for example, a block trunk copolymer having a branch comprising a random copolymer.

Moreover, there may also be used a PEN resin having a functional group, such as an epoxy group, a carboxyl group, a hydroxyl group, an amido group, or an amino group, that is obtained through reaction of a PEN resin with an unsaturated carboxylic acid, an unsaturated carboxylic acid derivative, an unsaturated epoxy compound, etc. at the end and/or in the main chain.

No particular limitation is imposed on the intrinsic viscosity of the PEN resin used in the present invention, and intrinsic viscosity is preferably 0.45 dl/g or more, more preferably 0.55 dl/g or more. When PEN resin having an intrinsic viscosity of less than 0.45 dl/g is incorporated in a large amount into the polyarylene sulfide resin composition of the present invention, the strength of the composition may decrease.

Also, no particular limitation is imposed on the manufacturing method of the PEN resin used in the present invention, and there may be employed a known manufacturing method for PEN or that for a polyester containing PEN and/or an ethylene naphthalate recurring unit. Thus, a PEN resin may be manufactured through transesterification and condensation polymerization by use of dialkyl naphthalenedicarboxylate or naphthalanedicarboxylic acid as an essential dicarboxylic acid component and ethylene glycol as an essential diol component. Examples of the dicarboxylic acid include a mixture of dimethyl naphthalenedicarboxylate and terephthalic acid, and examples of the diol include ethylene glycol.

(5) Filler (Component (E))

The filler serving as component (E) arbitrarily incorporated into the resin composition of the present invention may be selected according to purpose. The filler may be a known inorganic or organic filler and its form may be fibrous or non-fibrous (grains, needles, flakes, etc.).

A variety of inorganic fillers in the form of fibers, grains, powders, etc. may be used. Examples of fibrous inorganic fillers include glass fibers, carbon fibers, whiskers, alumina fibers, boron fibers, and metallic fibers such as stainless steel fibers. Frequently used fibrous inorganic fillers typically have an average fiber diameter of 0.1–50 μm, an average fiber length of 1 μm-1 mm, and an aspect ratio (l/d, l: average fiber length, d: average fiber diameter) of 3–100, preferably 5–50, particularly preferably 10–30. Examples of inorganic fillers in the form of grains or powders include talc, carbon black, graphite, titanium dioxide, silica, mica, calcium carbonate, calcium sulfate, barium carbonate, magnesium carbonate, magnesium sulfate, barium sulfate, oxysulfate, tin oxide, alumina, kaolin, silicon carbide, metal powders, glass powders, glass flakes, and glass beads. Of these, glass fibers, carbon fibers, whiskers, talc, silica, mica, and calcium carbonate are preferred, with glass fibers and calcium carbonate being particularly preferred.

Furthermore, the inorganic filler may be surface-treated with a coupling agent, etc. in order to improve adhesion to a resin. The coupling agent may be arbitrarily selected from a silane-type coupling agent, a titanium-type coupling agent, and conventionally known coupling agents. Of these, aminosilanes such as γ-aminopropyltrimethoxysilane, N-β-(aminoethyl)-γ-aminopropyltrimethoxysilane, γ-glycidoxypropyltrimethoxysilane, or β-(3,4-epoxycyclohexyl)ethyltrimethoxysilane; an epoxysilane; and isopropyltri(N-amidoethyl, aminoethyl) titanate are preferred.

Moreover, a film-former may be used in combination with the above-described coupling agent. No particular limitation is imposed on the film-former, and conventionally known film-formers may be used. Of these, film-formers such as a urethane-type film-former, an epoxy-type film-former, and a polyether-type film-former are preferably used.

Such inorganic fillers may be used singly or in combination of two or more species.

Examples of the organic filler include aromatic polyester fibers (aramid fibers, liquid crystal polyester fibers), polyamide fibers, fluororesin fibers, and acrylic resin fibers.

Such organic fillers may be used singly or in combination of two or more species and may be used in combination with inorganic filler.

2) Content of Each Component in the Polyarylene Sulfide Resin Composition (1) The Case in which the Polyarylene Sulfide Resin Composition is Formed of (A) a Polyarylene Sulfide Resin (PAS Resin) and (B) an Aliphatic or Saturated Cyclic Polycarbodiimide Resin or their Precursors (Hereinafter may Collectively be Referred to as Aliphatic Polycarbodiimide Resins)

The blend of the PAS resin and the aliphatic polycarbodiimide resins is typically 70–99.9% by weight of the PAS resin and 30–0.1% by weight of the aliphatic polycarbodiimide resins, preferably 90–99.8% by weight of the PAS resin and 10–0.2% by weight of the aliphatic polycarbodiimide resins, more preferably 95–99.5% by weight of the PAS resin and 5–0.5% by weight of the aliphatic polycarbodiimide resins. When the content of the PAS resin is less than 70% by weight, excellent mechanical properties of the polyarylene sulfide resin may be degraded and a relatively large amount of the polycarbodiimide resins generates an oil film on the molded product to result in poor adhesion to other resins. When the content of the polycarbodiimide resins is less than 0.1% by weight, adhesion may not be sufficiently improved.

(2) The Case in which the Polyarylene Sulfide Resin Composition is Formed of (A) a Polyarylene Sulfide Resin, (B) Aliphatic Polycarbodiimide Resins, and (C) Granular Silicone Compound:

The content of the (A) PAS resin is typically 65–99.8% by weight, preferably 85–99.8% by weight, more preferably 95–99.5% by weight. When the content of the PAS resin is less than 65% by weight, excellent mechanical properties of the polyarylene sulfide resin may be degraded, whereas when the content is in excess of 99.8% by weight, adhesion may not be sufficiently improved.

The content of the (B) aliphatic polycarbodiimide resins is described as typically 0.1–5% by weight, preferably 0.5–3% by weight, more preferably 1–2% by weight. A polycarbodiimide resin content of less than 0.1% by weight may result in poor effects attributed to the blend thereof, whereas when the content is in excess of 5% by weight, the viscosity of the composition may increase to result in difficulty in molding.

In the present invention, the aliphatic or saturated cyclic polycarbodiimide resin may be replaced partially or completely by a polymer-type silane coupling agent as described above. In this case, the coupling agent is blended in an amount of typically 0.1–5% by weight, preferably 0.5–3% by weight, more preferably 1–2% by weight in terms of the total amount of the aliphatic polycarbodiimide resins. When the content is less than 0.1% by weight, improvement of adhesion may not be attained, whereas when the content is in excess of 30% by weight, excellent mechanical properties of the polyarylene sulfide resin may be impaired. The mixing ratio of the aliphatic polycarbodiimide resins to the polymer-type silane coupling agent may be arbitrarily selected in the range of 100/0– 0/100 (the above-described aliphatic polycarbodiimide resins/the polymer-type silane coupling agent), preferably 90/10–10/90, and is particularly preferably 90/10–70/30.

The content of the (C) silicone compound grains is described as typically 0.1–30% by weight, preferably 0.5–20% by weight, more preferably 1–15% by weight. A content of less than 0.1% by weight may result in poor effects in the improvement of adhesion, whereas when the content is in excess of 30% by weight, excellent mechanical properties of the polyarylene sulfide resin may be impaired.

(3) The Case in which the Polyarylene Sulfide Resin Composition Comprises (A) a Polyarylene Sulfide Resin, (B) Aliphatic Polycarbodiimide Resins, and (D) a PEN Resin The blend of the (A) PAS resin and the (D) PEN resin is typically 50–99% by weight of the PAS resin and 1–50% by weight of the PEN resin, preferably 80–98% by weight of the PAS resin and 2–20% by weight of the PEN resin, more preferably 85–96% by weight of the PAS resin and 4–15% by weight of the PEN resin. When the content of the PAS resin is less than 50% by weight, heat resistance and mechanical strength attributed to the polyarylene sulfide resin composition may not be sufficiently attained, whereas when the content is in excess of 99% by weight, adhesion of the PAS resin composition to an epoxy resin adhesive may not be sufficiently attained.

The content of the (C) aliphatic polycarbodiimide resins in terms of a total amount (100 parts by weight) of the (B) PAS resin and the PEN resin is 0.1–10 parts by weight, preferably 0.2–5 parts by weight, more preferably 0.5–2 parts by weight. When the content of the aliphatic polycarbodiimide resins is less than 0.1 parts by weight, adhesion of the PAS resin composition is substantially not improved, whereas when the content is in excess of 10 parts by weight, the aliphatic polycarbodiimide resins exude to the composition or on the molded product to result in poor adhesion, and the viscosity of the composition may increase to result in difficulty in molding.

(4) The Case in which the Polyarylene Sulfide Resin Composition Comprises a Resin Composition of the Above-described (1) to (3) and (E) a Filler The amount of the (E) filler in terms of the total amount (100 parts by weight) of the resin composition of the above-described (1) to (3) is typically 1–400 parts by weight, preferably 10–200 parts by weight, more preferably 30–100 parts by weight. When the amount of the filler is in excess of 400 parts by weight, the viscosity of the composition may increase to result in difficulty in molding, whereas when it is less than 1 part by weight, effects of the filler per se may not be fully attained.

(5) Other Components

The polyarylene sulfide resin composition of the present invention may optionally contain—in addition to the above-described components—additives, PPS, and a thermoplastic resin other than the PEN resin as needed so long as the object of the invention is not impaired.

Examples of additives other than the above-described components include an additive such as an antioxidant, a thermal stabilizer, a lubricant, a colorant, a plasticizer, or an electric conductivity-imparting agent; a thermoplastic and/or thermosetting resin such as polyamide, an epoxy resin, a silicone resin, a silicone oil, a silicone oil-polyolefin in which a variety of functional groups are introduced, polyether-sulfone, or polyphenylene ether; rubber such as hydrogenated SBS, hydrogenated NBR, silicone rubber, or fluororubber; and a pigment.

The content of the other additives may be arbitrarily selected so long as the object of the invention is not impaired.

3) Method for Preparing the Polyarylene Sulfide Resin Composition

The polyarylene sulfide resin composition of the present invention may be prepared through appropriately formulating respective components selected from the above-described (A) PAS resin and (B) polycarbodiimide resin or precursors thereof according to need and, for example, melt-kneading.

The melt-kneading may be conducted through a typically known method, and specific resin compositions are obtained through any of the above methods in which each of the above-described components is mixed and dispersed homogeneously in a resin.

Also, a typical biaxial extruder, uniaxial extruder, etc. is preferably used in the melt-kneading.

Although no particular limitation is imposed on the conditions for the melt-kneading, an extremely high temperature and an extremely long operation time are preferably avoided in order to suppress foaming or decomposition of other components incorporated according to need. Thus, the melt-kneading is typically conducted at 280–350°, preferably 285–330°.

The thus-prepared polyarylene sulfide resin composition is usually cut or granulated into a size and shape, such as a pellet, suitable for use as material for secondary processing purposes, particularly as material for injection molding, as required.

4) Method of Forming a Molded Substance From a PAS Resin Composition

The prepared PAS resin composition is cut or granulated into a size and shape, such as a pellet, suitable for use as material for secondary processing purposes, and a container is produced from the thus-formed material by molding, particularly by injection molding. The shape of the container may be selected according to the application of electronic-component material to be used, as required. For example, the container may be formed into a box or cylinder.

2. Container for Accommodating Electronic-component Material

A container for accommodating electronic-component material according to the present invention comprises a molded substance formed by molding of any one of the foregoing PAS resin compositions. Preferably, a PAS resin composition desirable for use in manufacturing the foregoing container is a substance molded from (1) a PAS resin composition comprising (A) 70 to 99.9% by weight PAS resin and (B) 30 to 0.1% by weight polycarbodiimide resin and/or polycarbodiimide precursor; or (2) a PAS resin composition comprising 100 parts by weight of PAS resin formed of (A) 70 to 99.9% by weight PAS resin and (B) 30 to 0.1% by weight polycarbodiimide resin and/or polycarbodiimide precursor, and (E) 1 to 400 parts by weight of filler, particularly, inorganic filler. In this case, the container may be, wholly or in part, formed from a substance which is molded from a PAS resin composition. For example, in the case of a box-shaped container, only the frame of the container may be formed from the molded substance made of the PAS resin composition, and the bottom of the container may be formed from another material such as another resin or metal. The container according to the present invention is used for the purpose of accommodating electronic-component material, and there is no particular limitation to the use of the container. In one example, the container is used for accommodating the entirety or a part of electronic-component material. In another example, there is no particular limitation to the shape of the container, and the shape of the container is selected according to the application of electronic-component material to be used, as required. For instance, the container may be formed into a box or cylinder. Further, there is no particular limitation to the type of electronic-component material. The container may be used for accommodating electronic-component materials, such as connectors, relays, or coils; or component materials related to semiconductor devices, such as transistors.

3. Electronic Components

Electronic components referred to herein are characterized by the entirety or part of conductive portions of electronic-component material being accommodated in the container and the conductive portions being sealed by a sealant filled in the container. There is no particular limit to the type of electronic-component material, and the electronic-component material comprises electronic-component material such as connectors, relays, or coils; and component materials related to semiconductor devices, such as transistors. A conductive portion of the electronic-component material, e.g., a circuit, a coil, or a substrate, is entirely or partly accommodated in the container, and the thus-accommodated portions of the electronic-component material are sealed by a sealant filled in the container. So long as the sealant is capable of insulating the conductive portion from other portions of the electronic-component material and of protecting the conductive portion(s) from corrosion, the type of sealant is not particularly limited. Preferably, epoxy resins are used as the sealant. The sealant is encapsulated in the container and covers the conductive portion of the electronic-component material. There is no particular limitation to the amount of sealant, and the thickness of sealant may be selected according to the application of electronic-component material to be used, as required.

In another embodiment of an electronic component according the present invention, a PAS resin comprises (A) 70 to 99.9% by weight PAS resin and (B) 30 to 0.1% by weight polycarbodiimide resin and/or polycarbodiimide precursor, or 100 parts by weight of foregoing PAS resin to which is added (C) 1 to 400 parts by weight of inorganic filler, as required, and the resultant PAS resin is molded into a plate, and conductive portions of electronic-component material are, wholly or in part, mounted on the thus-formed plate, so that the conductive portion is sealed with a sealant. There is no limit to the size and shape of the plate molded from PAS resin, and the shape and size of the plate may be selected according to the application of electronic-component material to be used, as required. Further, the thickness of the sealant is also suitably selected according to need. With regard to the type of sealant, the same descriptions as those previously provided for explanation of the container shall apply to the sealant.

The polyarylene sulfide resin composition, the container for accomodating electronic-component material, and the electronic component according to the present invention will be described further hereinbelow by way of examples.

[Examples 1 through 11 and Comparative Examples 1 through 10]

1. Evaluation of Physical Properties

Various physical properties of a PPS resin composition according to the embodiment were measured by the following methods.

(1) Adhesion Characteristics

Two pieces of specimen (formed by cutting a dumbbell-shaped specimen used for ASTM-0638 Test into two subdivisions in the direction perpendicular to the direction of drawing) were laminated together through use of an epoxy-resin-based adhesive or a silicone-resin-based adhesive in such a way as to produce a bonded area of 1 cm$^2$. The thus-laminated specimen was drawn at both ends until it was broken.

The bonding strength (MPa) was calculated from the stress obtained at a point in time when the specimen was broken.

Further, the shape of the disrupted portions of the specimen was visually evaluated. With regard to the form of failure, "material failure" represents a state in which fracture develops not in the bonded surface of the specimen but in the specimen, thus indicating that the pieces of specimen were firmly bonded together. In contrast, "interfacial separation" represents a state in which exfoliation develops in the boundary area between the specimen and the adhesive, thus indicating that the specimens were weakly bonded. "Cohesion failure" represents a state in which fracture develops not in the interface between the bonded surfaces but in an adhesive layer, thus indicating that the specimens were firmly bonded together.

(2) Spiral Flow Length (SFL)

The spiral flow length (mm) of the PPS resin composition was measured under the conditions that the PPS resin composition was formed at an injection pressure of 1000 kg/cm$^2$ at a resin temperature of 320° and a mold temperature of 135° through use of a mold having a thickness of 1.0 mm.

(3) Tensile Strength, Tensile Modulus, and Tensile Elongation

Tensile strength, tensile modulus, and tensile elongation of the PPS resin composition were measured according to ASTM-D638.

(4) Flexural Strength and Flexural Modulus

Flexural strength and flexural modulus of the PPS resin composition were measured according to ASTM-D790.

(5) Izod Impact Test

Izod impact strength of the PPS resin composition was measured according to ASTM-D256 for the respective cases where the PPS resin composition was notched and where the PPS resin composition was not notched.

2. components

The PAS resin compositions used in the foregoing embodiments comprise components provided below.

(1) (A) PPS Resin

In a polymerization reactor equipped with a stirrer were placed hydrated sodium sulfate ($Na_2S_5H_2O$; 833 mols), lithium chloride (LiCl; 830 mols), and NMP (500 liters) The mixture was subjected to dehydration for one hour while the temperature was maintained at 145° C. under reduced pressure. Subsequently, the reaction mixture was cooled to 45° C., dichlorobenzene (DCB; 905 mols) was added thereto, followed by polymerization at 260° C. for three hours. The contents were washed five times with hot water, once with N-methyl-2-pyrolidone (NMP) having a temperature of 170° C., and three times with water, and then dried at 185° C., to thereby obtain a linear PPS resin.

The resultant PPS resin was used as PPS resin-1.

As PPS resin-2, there was used thermal-oxidation-crosslinked polyphenylene sulfide manufactured by Toray Industries, Inc. (trade name: M1900, viscosity $\eta_{app}$=3300 poise (300° C., shear rate=200 sec$^{-1}$)).

(2) (B) Aliphatic Polycarbodiimide Resin or Saturated Cyclic Polycarbodiimide Resin As the aliphatic polycarbodiimide resin (aliphatic PC), there was used a carbodiimide powder manufactured by Nissinbo Industries, Inc. (trade name: Carbodilite HMV-8CA, carbodiimide equivalent=278, average grain size=1000 μm or less). As the aromatic polycarbodiimide resin (aromatic PC), there was used a carbodiimide powder manufactured by Nissinbo Industries, Inc. (trade name: Carbodilite 1OM-SP, carbodiimide equivalent=216, average grain size=1000 μm or less.)

In a referential example where a polymer silane coupling agent was used instead of an aliphatic polycarbodiimide resin, there was used a polymer silane coupling agent manufactured by Nippon Unicar Co., Ltd. (trade name: MAC-2301, alkoxyl group equivalent=248, hydroxyl group equivalent=1200) having, in a side chain of polydimethylsiloxane, three units consisting of an alkoxyl group (x), a hydroxyl group (Y), and a polyether group (Z) in the molecule.

(3) (C) Granular Silicone Compound

As the granular silicone compound, there was used reactive granular silicone compound manufactured by Toray-Dow Corning Co., Ltd. (trade name: DC4-7051, average grain size=several dozens of μm) having an epoxy group.

(5) (D) Polyethylene Naphthalate Resin

As the polyethylene naphthalate resin, there was used a polyester copolymer manufactured by ICI Ltd. (trade name: KALIDAR; a copolymer formed of ethylene naphthalate recurrent units (8 mol %) and ethylene terephthalate recurrent units (92 mol %) and having an intrinsic viscosity of 0.55 dl/g.)

(6) (E) Filler

As Filler 1, glass fiber manufactured by Asahi Fiberglass Co., Ltd. (trade name: JAFT591) was used.

As Filler 2, calcium carbonate manufactured by Maruo Calcium Co., Ltd. (trade name: MSK-PO) was used.

3. Preparation and Evaluation of a PPS Resin Composition

The aforementioned compositions were mixed homogeneously in amounts shown in Tables 1 through 3 by use of a Henschel mixer. Respective mixtures were melted and kneaded by use of a biaxial extruder (TEM35 manufactured by Toshiba Machine Co., Ltd.) while the cylinder temperature was maintained at 310–350° C., to thereby obtain pellets of a polyphenylene sulfide resin composition (a PPS resin). The resultant pellets were used to determine properties of respective PPS resin compositions. The results are shown in Tables 1 through 3.

TABLE 1

|  |  | Ex. 1 | Comp. Ex. 1 | Comp. Ex. 2 | Ex. 2 | Comp. Ex. 3 | Ex. 3 | Comp. Ex. 4 |
|---|---|---|---|---|---|---|---|---|
| Additives | PPS-1 (wt %) | 98.6 | 100 | 99 | 98.3 | 100 | — | — |
|  | PPS-2 (wt %) | — | — | — | — | — | 98.3 | 100 |
|  | Aliphatic PC (wt %) | 1.4 | — | — | 1.7 | — | 1.7 | — |
|  | Aromatic PC (wt %) | — | — | 1 | — | — | — | — |
|  | Glass fiber*) (parts by weight) | 43 | 43 | 11 | 67 | 67 | 67 | 67 |
| Results | SFL (mm) | 73 | 65 | 110 | 66 | 59 | 109 | 97 |
| of | Adhesion Strength (Mpa) | 3.38 | 2.62 | 2.13 | 5.93 | 3.21 | 4.48 | 2.99 |
| Evaluation | Type of failure | C.F. | I.S. | I.S. | C.F. | I.S. | C.F. | I.S. |
|  | Density (g/cm³) | 1.587 | 1.567 |  | 1.658 | 1.664 | 1.665 | 1.661 |
|  | Tensile Strength (Mpa) | 182 | 158 |  | 199 | 182 | 153 | 139 |
|  | characteristics Modulus (Mpa) | 9080 | 8600 |  | 10800 | 10300 | 10400 | 10800 |
|  | Flexural Elongation (%) | 2.5 | 2.3 |  | 2.4 | 2.3 | 1.8 | 1.8 |
|  | characteristics Strength (Mpa) | 260 | 226 |  | 291 | 268 | 235 | 214 |
|  | Modulus (Mpa) | 12600 | 10600 |  | 15200 | 13700 | 14900 | 14300 |

Note) C.F.: Cohesion failure I.F.: Interfacial failure
The amounts of the components marked with an asterisk are expressed in terms of 100 parts by weight of the total of other components.

TABLE 2

|  |  | Ex. 4 | Comp. Ex. 5 | Reference Ex. |
|---|---|---|---|---|
| Additives | PPS-1 (wt %) | 82.1 | 85.7 | 82.1 |
|  | Granular silicone compound (wt %) | 15.0 | 14.3 | 15.0 |
|  | Aliphatic PC (wt %) | 2.9 | 0 | 0 |
|  | Polymer-type silane Coupling agent (wt %) | 0 | 0 | 2.9 |
|  | Glass fiber*) (parts by weight) | 43 | 43 | 43 |
| Results Of Evaluation | Epoxy Adhesion Strength (Mpa) | 9.83 | 4.46 | 7.73 |
|  | Type of failure | Material failure | Interfacial separation | Material failure |
|  | Silicone Adhesion Strength (Mpa) | 1.56 | — | 8.32 |
|  | Type of failure | Cohesion failure | — | Cohesion failure |

Note) The amounts of the components marked with an asterisk are expressed in terms of 100 parts by weight of the total of other components.

[Examples 9–15, Comparative Examples 7–12]

By use of a Henschel mixer, the components shown in section "2. components" in Example 1 and others were mixed homogeneously in amounts shown in Table 4. The mixture was melt-kneaded by use of a biaxial extruder (TEM35 manufactured by Toshiba Machine Co., Ltd.) while the cylinder temperature was maintained at 310–350° C., to thereby obtain pellets of polyphenylene sulfide resin composition (PPS resin), which are described in each of the Examples and Comparative Examples. The resultant pellets were subjected to injection molding under the conditions of a cylinder temperature of 320° C. and a metallic mold temperature of 135° C., to thereby obtain box-shaped molded articles each having exterior dimensions of 100 mm×75 mm×45 mm and a thickness of 1 mm. Into the mold, there was added a mixture of two kinds of epoxy sealant (trade names: XNR5002 and SNH5002, both manufactured by Ciba-Geigy) with the mixing ratio of XNR5002/SNH5002 being 10/9 by weight. The mixture was heated for two hours at 130° C. and then for one hour at 150° C. so as to cure the mixture. Subsequently, after the epoxy sealant

TABLE 3

|  |  | Ex. 5 | Ex. 6 | Ex. 7 | Comp. Ex. 6 | Ex. 8 |
|---|---|---|---|---|---|---|
| Additives | PPS-1 (wt %) | 85 | 85 | 85 | 85 | 70 |
|  | PEN resin (wt %) | 15 | 15 | 15 | 15 | 30 |
|  | Aliphatic PC (wt %) | 1 | 1 | 1 | 0 | 1 |
|  | Glass fiber*) (parts by weight) | 30 | 0 | 40 | 0 | 30 |
| Results | SFL (mm) | 275 | — | 258 | — | 505 |
| of | Adhesion Strength (Mpa) | 7.33 | 1.46 | 9.24 | 1.12 | 4.77 |
| Evaluation | Type of failure | Material failure | Material failure | Material failure | Material failure | Material failure |
|  | Density (g/cm³) | 1.560 | — | 1.658 | — | — |
|  | Tensile characteristics |  |  |  |  |  |
|  | Strength (Mpa) | 146 | — | 138 | — | — |
|  | Modulus (Mpa) | 8260 | — | 10500 | — | — |
|  | Elongation (%) | 2.2 | — | 1.7 | — | — |
|  | Flexural characteristics |  |  |  |  |  |
|  | Strength (Mpa) | 204 | — | 191 | — | — |
|  | Modulus (Mpa) | 11200 | — | 15000 | — | — |
|  | IZOD with notch (kj/m²) | 6.4 | — | 6.2 | — | — |
|  | IZOD without notch (kj/m²) | 30.2 | — | 24.3 | — | — |

Note) The amounts of the components marked with an asterisk are expressed in terms of 100 parts by weight of the total of other components.

was cured, the center section of the box-shaped molded article was cut, and the cut surface thereof was observed by use of a scanning electron microscope to examine whether there occurred separation on the interface between the PAS material and the epoxy sealant. The results are shown in Table 4.

TABLE 4

| | | Ex. 8 | Ex. 9 | Ex. 10 | Ex. 11 | Comp. Ex. 7 | Comp. Ex. 8 |
|---|---|---|---|---|---|---|---|
| Additives | PPS (wt %) | 99 | 99 | 95 | 83 | 100 | 67 |
| | Polycarbodiimide resin (wt %) | 1 | 1 | 5 | 17 | 0 | 33 |
| | GF*) (parts by weight) | 0 | 40 | 70 | 110 | 40 | 65 |
| | Calcium carbonate*) (parts by weight) | 0 | 0 | 0 | 110 | 0 | 0 |
| Results of Evaluation | Initial | ○ | ○ | ○ | ○ | ○ | N/A |
| | After TCT | ○ | ○ | ○ | ○ | × | — |
| | After PCT | ○ | ○ | ○ | ○ | × | — |

Note) N/A: Molding was impossible.
1) The amounts of the components marked with an asterisk are expressed in term of 100 parts by weight of the total of other components.
2) ○ and × in Table 4 indicate the following. ○: No separation ×: Separation
3) "After TCT" in Table 4 shows the results obtained after 100 repetitions of a heat treatment cycle, each cycle consisting of heating at 13° C. for one hour and cooling at −40° C. for one hour. "After PCT" in Table 4 shows the results obtained after performing a steam heating and pressurization treatment in a pressure-resisting container for 100hours under the conditions of a temperature of 130° C., a relative humidity of 100%, and a pressure of 2.02 atm.

As described above, the present invention provide polyarylene sulfide resin compositions which exhibit enhanced characteristics of PAS resins, such as strength, and which are also endowed with excellent adhesive characteristics to adhesives such as epoxy resins.

There are also provided a container for accommodating an electric component material and an electric component whose conductive portions are wholly or partially accomodated in the container, which exhibit excellent adhesive characteristics to a sealant by complete or partial employment of a molded PAS resin comprising a PAS resin composition having the aforementioned excellent properties.

What is claimed is:

1. A polyarylene sulfide resin composition comprising (A) 70–99.9% by weight of a polyarylene sulfide resin and (B) 30–0.1% by weight of an aliphatic or a saturated cyclic polycarbodiimide resin or a precursor thereof.

2. A polyarylene sulfide resin composition comprising (A) 65–99.8% by weight of a polyarylene sulfide resin; (B) 0.1–5% by weight of an aliphatic or a saturated cyclic polycarbodiimide resin or a precursor thereof; and (C) 0.1–30% by weight of a granular silicone compound.

3. A polyarylene sulfide resin composition comprising 100 parts by weight of a resin component containing (A) 70–99.9% by weight of a polyarylene sulfide resin and (B) 30–0.1% by weight of an aliphatic or a saturated cyclic polycarbodiimide resin or a precursor thereof, and 1–400 parts by weight of (E) a filler.

4. A polyarylene sulfide resin composition comprising 100 parts by weight of a resin component containing (A) 65–99.8% by weight of a polyarylene sulfide resin, (B) 0.1–5% by weight of an aliphatic polycarbodiimide resin or a saturated cyclic polycarbodiimide resin or a precursor thereof, and (C) 0.1–30% by weight of a granular silicone compound; and 1–400 parts by weight of (E) a filler.

5. A polyarylene sulfide resin composition comprising 90–99.9% by weight of a resin component containing (A) 50–96 parts by weight of a polyarylene sulfide resin and (D) 4–50 parts by weight of a polyethylene naphthalate resin; and (B) 0.1–10% by weight of an aliphatic or saturated cyclic polycarbodiimide resin or a precursor thereof.

6. The polyarylene sulfide resin composition according to claim 5, wherein the component (D), a polyethylene naphthalate resin, contains 5 mol % or more of an ethylene naphthalate recurring unit.

7. A polyarylene sulfide resin composition comprising 100 parts by weight of a resin component which comprises 90–99.9% by weight of a resin compositon containing (A) 50–96 parts by weight of a polyarylene sulfide resin and (D) 4–50 parts by weight of a polyethylene naphthalate resin, and (B) 0.1–10% by weight of an aliphatic or saturated cyclic polycarbodiimide resin or a precursor thereof; and 1–800 parts by weight of (E) filler.

8. A container for accommodating electronic-component material which employes, wholly or in part, a molded polyarylene sulfide resin comprising a polyarylene sulfide resin composition as described in claim 1.

9. A container for accommodating electronic-component material which employes, wholly or in part, a molded polyarylene sulfide resin comprising a polyarylene sulfide resin composition as described in claim 3.

10. An electronic component having a conductive portion which is wholly or partially accommodated in a container for accommodating electronic-component material as described in claim 8, wherein said conductive portion is sealed by a sealant encapsulated in said container.

11. An electronic component having a conductive portion which is wholly or partially accommodated in a container for accommodating electronic-component material as described in claim 9, wherein said conductive portion is sealed by a sealant encapsulated in said container.

12. An electronic component having a conductive portion which is wholly or partially placed on a plate comprising a polyarylene sulfide resin composition as described in claim 1, wherein said conductive portion is sealed by a sealant.

13. A electronic component having a conductive portion which is wholly or partially placed on a plate comprising a polyarylene sulfide resin composition as described in claim 3, wherein said conductive portion is sealed by a sealant.

* * * * *